United States Patent [19]

Levrai

[11] Patent Number: 5,094,510
[45] Date of Patent: Mar. 10, 1992

[54] LOAD SENSING SUPPORTING MEMBER FOR A SUSPENSION SPRING

[75] Inventor: Roland Levrai, Stains, France

[73] Assignee: Bendix Europe Services Techniques, Drancy, France

[21] Appl. No.: 534,063

[22] Filed: Jun. 6, 1990

[30] Foreign Application Priority Data

Jun. 28, 1989 [FR] France .................. 89 08608

[51] Int. Cl.[5] ........................................... B60T 08/22
[52] U.S. Cl. .................................. 303/22.5; 303/22.8; 303/9.69
[58] Field of Search ........................................ 188/195; 303/22.5–22.8, 9.69, 22.1–22.4, DIG. 1, DIG. 2; 267/64.16, 219, 220

[56] References Cited

U.S. PATENT DOCUMENTS

| 2,169,629 | 10/1936 | Browall | 188/195 |
|---|---|---|---|
| 4,150,855 | 4/1979 | Demido | 303/22.7 |
| 4,232,909 | 11/1980 | Farr | 303/22.7 |
| 4,325,581 | 4/1982 | Pickering | 303/22.7 |
| 4,579,392 | 4/1986 | Farr | 303/22.8 |
| 4,824,180 | 4/1989 | Levrai | 303/22.5 |
| 4,828,329 | 5/1989 | Schonlau et al. | 303/22.8 X |

FOREIGN PATENT DOCUMENTS

| 2821779 | 11/1978 | Fed. Rep. of Germany | 303/9.69 |
|---|---|---|---|
| 3224295 | 12/1983 | Fed. Rep. of Germany | |
| 2302428 | 9/1976 | France | |
| 2608540 | 6/1988 | France | |
| 283328 | 9/1988 | France | |
| 1542507 | 3/1979 | United Kingdom | |
| 2041473 | 9/1980 | United Kingdom | 303/9.69 |
| 2144499 | 3/1985 | United Kingdom | 188/195 |

OTHER PUBLICATIONS

Japanese Abstract 59-202964 "Brake Fluid Pressure Control Mechanism", Nov. 16, 1984–Tatsuo Uchihara.

Primary Examiner—Robert J. Oberleitner
Assistant Examiner—Alfred Muratori
Attorney, Agent, or Firm—Larry J. Palguta; Ken C. Decker

[57] ABSTRACT

The supporting component for a suspension spring (3) for a motor vehicle, forming a pressure sensor for a fluid-controlled brake regulator, comprises a base (1) integral with the vehicle, and a cap (5) for supporting the spring (3), which cap (5) is sealingly and slidably mounted on the base (1) counter to the pressure prevailing in a sealed chamber (20) coaxial with the spring (3) and formed between the base (1) and a part integral with the cap. The chamber (20) communicates with a chamber, outside the support component, for controlling the regulator, and a mechanism (10) for guiding the cap relative to the base is arranged axially to the center of the component.

6 Claims, 1 Drawing Sheet

LOAD SENSING SUPPORTING MEMBER FOR A SUSPENSION SPRING

BACKGROUND OF THE INVENTION

The present invention relates to a supporting component for a suspension spring for a motor vehicle, forming a pressure sensor for a fluid-controlled brake regulator.

Fluid-controlled brake regulators driven by a vehicle's suspension are known. For example, the patent GB-B-1,542,507 describes such a system. For the efficient operation of these regulators, the pressure sensor must be simple, reliable and easy to install in the vehicle. The U.S. Pat. No. 4,824,180 teaches such a sensor comprising an annular pressure chamber receiving an annular piston which is displaced as a function of the force acting on the suspension spring supporting cap.

Although entirely satisfactory, such a sensor is relatively expensive to produce on account of its annular members.

In order to overcome this disadvantage, the U.S. Pat. No. 4,828,329 discloses a device comprising a regulator arranged between the turns of the suspension spring and having a closed pressure chamber coaxial with the device. However, this device is extremely complex, therefore expensive, and, in the event of a leak of the fluid enclosed in the chamber, the regulator behaves in a manner detrimental to safety.

SUMMARY OF THE INVENTION

The object of the present invention is to overcome these disadvantages. The invention therefore relates to a supporting component for a suspension spring for a motor vehicle, forming a pressure sensor for a fluid-controlled brake regulator, this component comprising a base integral with the vehicle, and a spring supporting cap which is sealingly and slidably mounted on the base counter to the pressure prevailing in a sealed chamber coaxial with the spring and formed between the base and a part integral with the cap.

According to the invention, this chamber communicates with a chamber, outside the supporting component, for controlling the regulator, and a means for guiding the cap relative to the base is arranged axially to the center of the component.

According to a first embodiment, the guiding means comprises a member for guiding a coaxial rod which is integral with the cap and carries a piston determining, with the base, the sealed chamber.

According to another embodiment, the guiding means comprises a part integral with the base and projecting coaxially from the base so as to cooperate with the inner wall of the said cap.

BRIEF DESCRIPTION OF THE DRAWINGS

The invention will be better understood, and other objects, advantages and features thereof will become more clearly apparent on reading the description which follows of preferred embodiments given by way of a non-limiting example and which is accompanied by one sheet of drawings, in which.

DETAILED DESCRIPTION OF THE INVENTION

Referring now to the figures, the base 1 of the supporting component shown is integral, for example, with the hub of a wheel. The suspension spring 3 rests on the periphery of a cap 5. A guiding means 10 is provided to ensure correct sliding of the cap 5 relative to the base 1.

Figure 1:
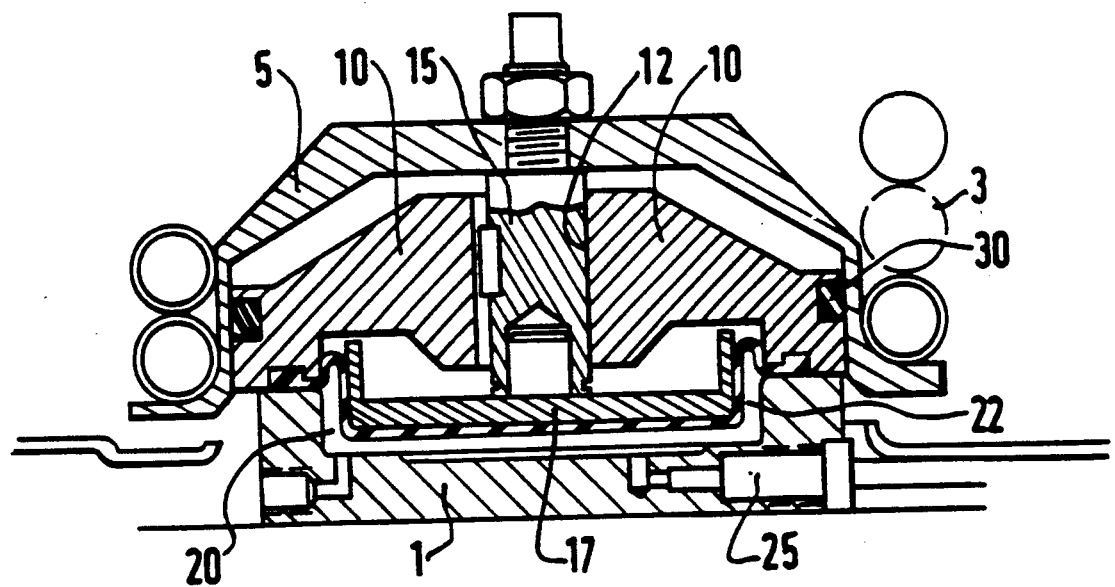
FIGS. 1 and 2 represent, diagrammatically in section, two different embodiments of a supporting component in accordance with the invention.

In the example shown in FIG. 1, this guiding means 10 comprises a component in the form of an upturned plate integral with the base 1. This plate is pierced at its center with an orifice 12 through which a rod 15 integral with the cap 5 passes, this rod 15 and this orifice 12 constituting a means for guiding the cap 5.

In the region situated between this pierced plate and the base 1 of the component, a piston 17 integral with the rod 15, therefore with the cap 5, determines a sealed chamber 20 between the base 1 and the piston 17 by virtue of a displaceable membrane 22, the peripheral edge of which is inserted between the plate and the base so as to ensure sealing. A channel 25 puts this sealed chamber 20 in communication with the chamber for controlling the fluid-controlled brake regulator (not shown in the figures).

The plate is provided, at its periphery, with a seal 30 cooperating with the inner wall of the cap, in a vertical part of the latter, so as to ensure sealing of the supporting component.

Figure 2:
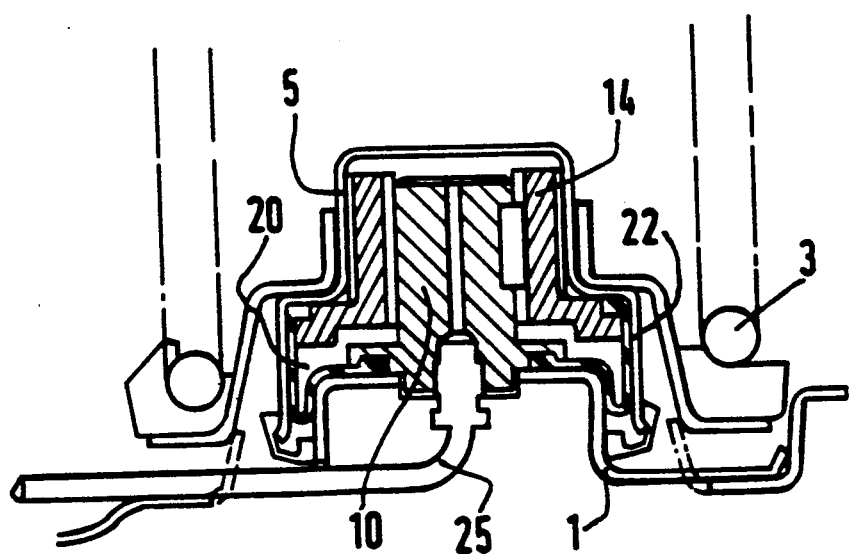

In the embodiment illustrated in FIG. 2, the guiding means 10 consists of a coaxial cylindrical member. The inner part of the cap 5 is provided with a substantially annular component 14 cooperating with the cylindrical member so as to ensure the required guiding.

The displaceable membrane 22 ensures sealing of the pressure chamber 20, its two concentric peripheral edges being respectively fitted between the base 1 and the cylindrical member, and between the annular component 14 and the cap 5.

With these two embodiments described, a supporting component is obtained which forms a pressure sensor of extreme simplicity and reliability, at a very reasonable price.

What is claimed is:

1. A supporting component for a suspension spring of a motor vehicle and which comprises a vehicle load pressure sensor connected with and for controlling a fluid-controlled brake regulator, said supporting component comprising a base fixed to said vehicle, and a cap for supporting said spring, said cap sealingly and slidably mounted on said base counter to fluid pressure continuously present in a sealed chamber coaxial with a longitudinal axis of said spring and formed between the base and a part fixed with and stationary relative to said cap, said sealed chamber communicating with a regulator chamber located outside of said supporting component and which controls said brake regulator, and means for guiding said cap relative to said base being located along an axial axis of the supporting component, so that said part is movable directly with said cap and comprises a piston member continuously spaced apart from the base and which effects the communication of fluid pressure to said regulator chamber of the brake regulator.

2. The supporting component according to claim 1, wherein said guiding means comprises a member for guiding the part which is a rod that is fixed to and stationary relative to said cap and which carries said piston member determining, with said base, said sealed chamber.

3. The supporting component according to claim 2, wherein said guiding means comprises a component in the form of an inverted plate fixed with the base and pierced at its center with an orifice through which said rod passes slidably.

4. The supporting component according to claim 1, wherein the guiding means comprises a cylindrical part fixed with said base and projecting coaxially with said longitudinal axis and from said base so as to cooperate with an inner wall of said cap.

5. The supporting component according to claim 4, wherein a channel passes through said guiding means so as to place said chambers in communication.

6. The supporting component according to claim 1, wherein a displaceable membrane ensures sealing of said sealed chamber.

* * * * *